US006572413B2

(12) United States Patent
Olson et al.

(10) Patent No.: US 6,572,413 B2
(45) Date of Patent: Jun. 3, 2003

(54) DSX MODULE WITH REMOVABLE JACK

(75) Inventors: Cynthia G. Olson, Carver, MN (US);
Dennis M. Burroughs, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/012,901

(22) Filed: Nov. 5, 2001

(65) Prior Publication Data

US 2002/0081907 A1 Jun. 27, 2002

Related U.S. Application Data

(63) Continuation of application No. 09/226,761, filed on Jan. 6, 1999, now Pat. No. 6,328,608, and a continuation of application No. 08/808,086, filed on Feb. 28, 1997, now Pat. No. 5,913,701.

(51) Int. Cl.[7] ............................................. H01R 13/703
(52) U.S. Cl. ...................................................... 439/668
(58) Field of Search ................................. 439/668, 669, 439/188; 200/51.1

(56) References Cited

U.S. PATENT DOCUMENTS

| 4,749,968 | A | * | 6/1988 | Borroughs | 333/105 |
| 4,768,961 | A | | 9/1988 | Lau | 439/61 |
| 4,815,104 | A | * | 3/1989 | Williams et al. | 375/36 |
| 5,214,673 | A | * | 5/1993 | Morgenstern et al | 375/36 |
| 5,246,378 | A | * | 9/1993 | Seiceanu | 375/36 |
| 5,348,491 | A | * | 9/1994 | Louwagie et al. | 439/188 |
| 5,413,494 | A | * | 5/1995 | Dewey et al. | 439/188 |
| 5,467,062 | A | * | 11/1995 | Burroughs | 439/944 |
| 5,913,701 | A | | 6/1999 | Olson et al. | 439/668 |
| 6,328,608 | B1 | | 12/2001 | Olson et al. | 439/668 |

* cited by examiner

Primary Examiner—Neil Abrams
(74) Attorney, Agent, or Firm—Merchant & Gould P.C.

(57) ABSTRACT

A jack module system is disclosed. The system includes a housing (12) defining an interior. The system also includes first and second jacks (14, 14'). Each jack (14, 14') includes a jack body (100) including upper and lower edges. Receiving means are disposed within the housing (12) for slidably receiving the jack bodies (100) in a first direction and slidably removing the jack bodies (100) in a direction opposite the first direction. The jacks (14, 14') are stacked along an axis perpendicular to the first transverse dimension. The system also includes a cover (102) removably securing the jack bodies (100).

6 Claims, 11 Drawing Sheets

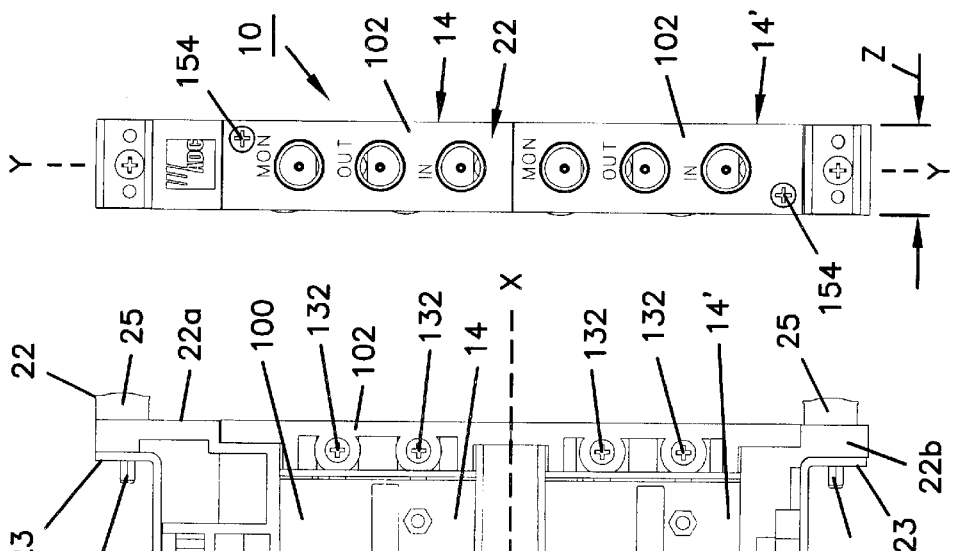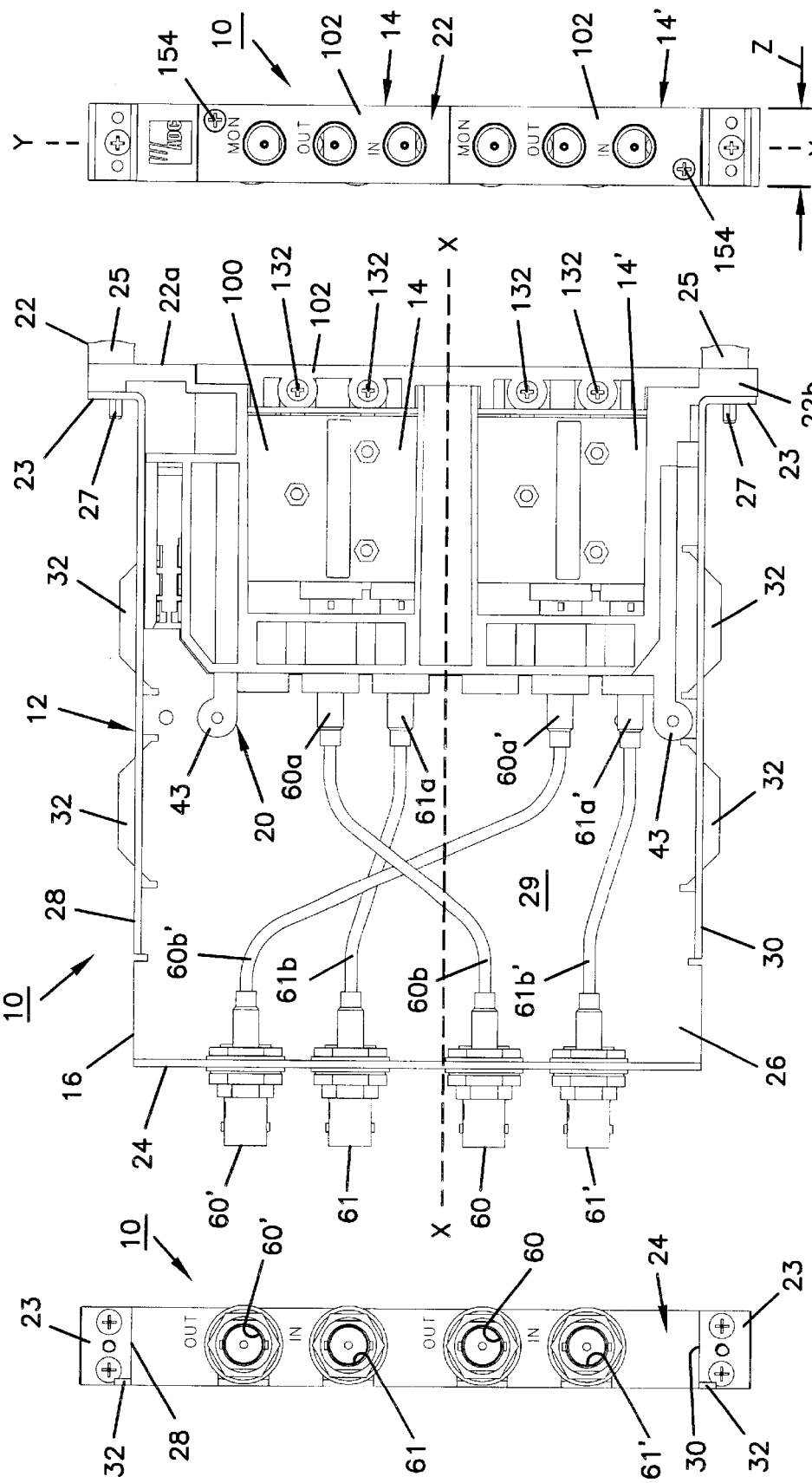

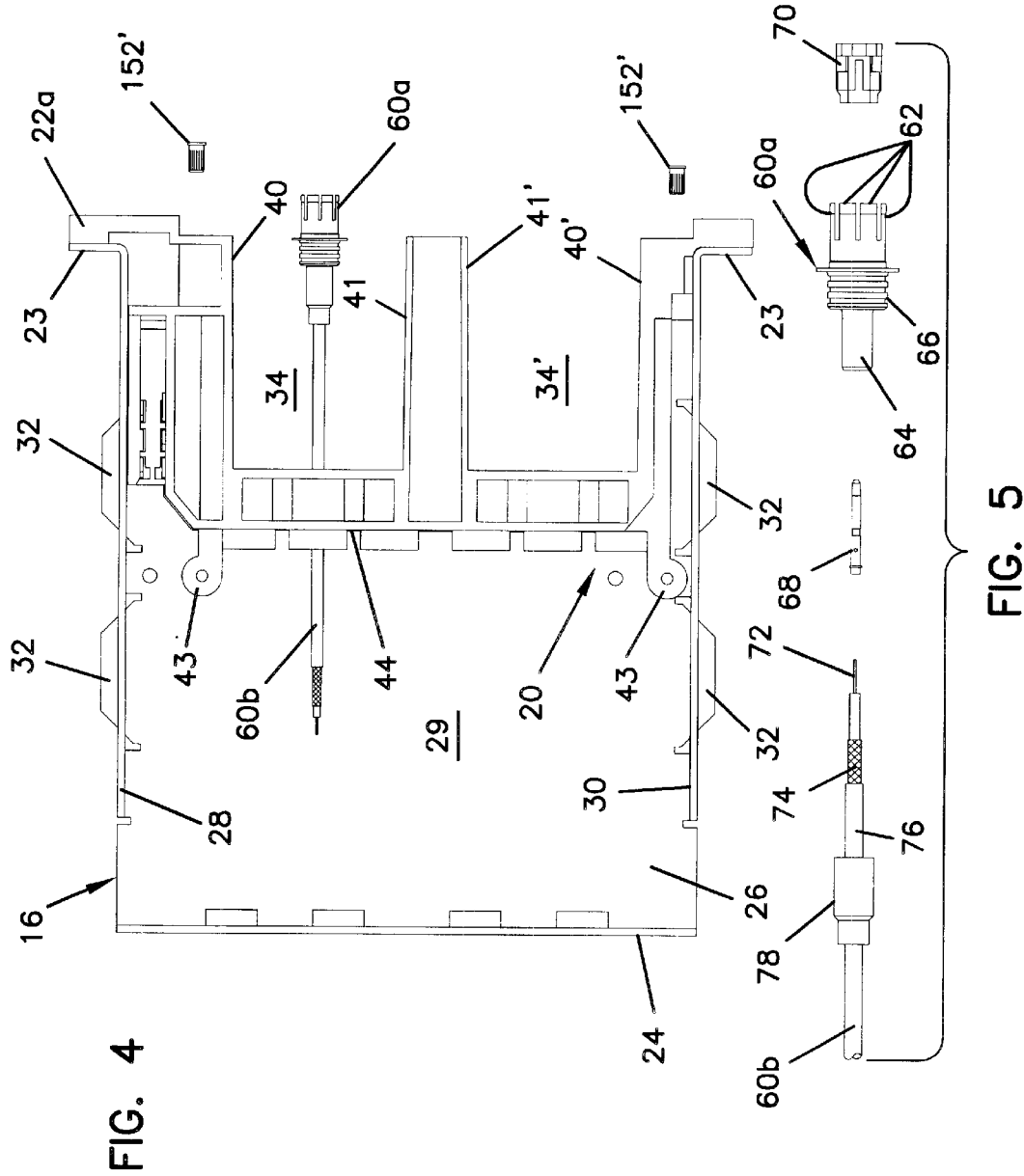

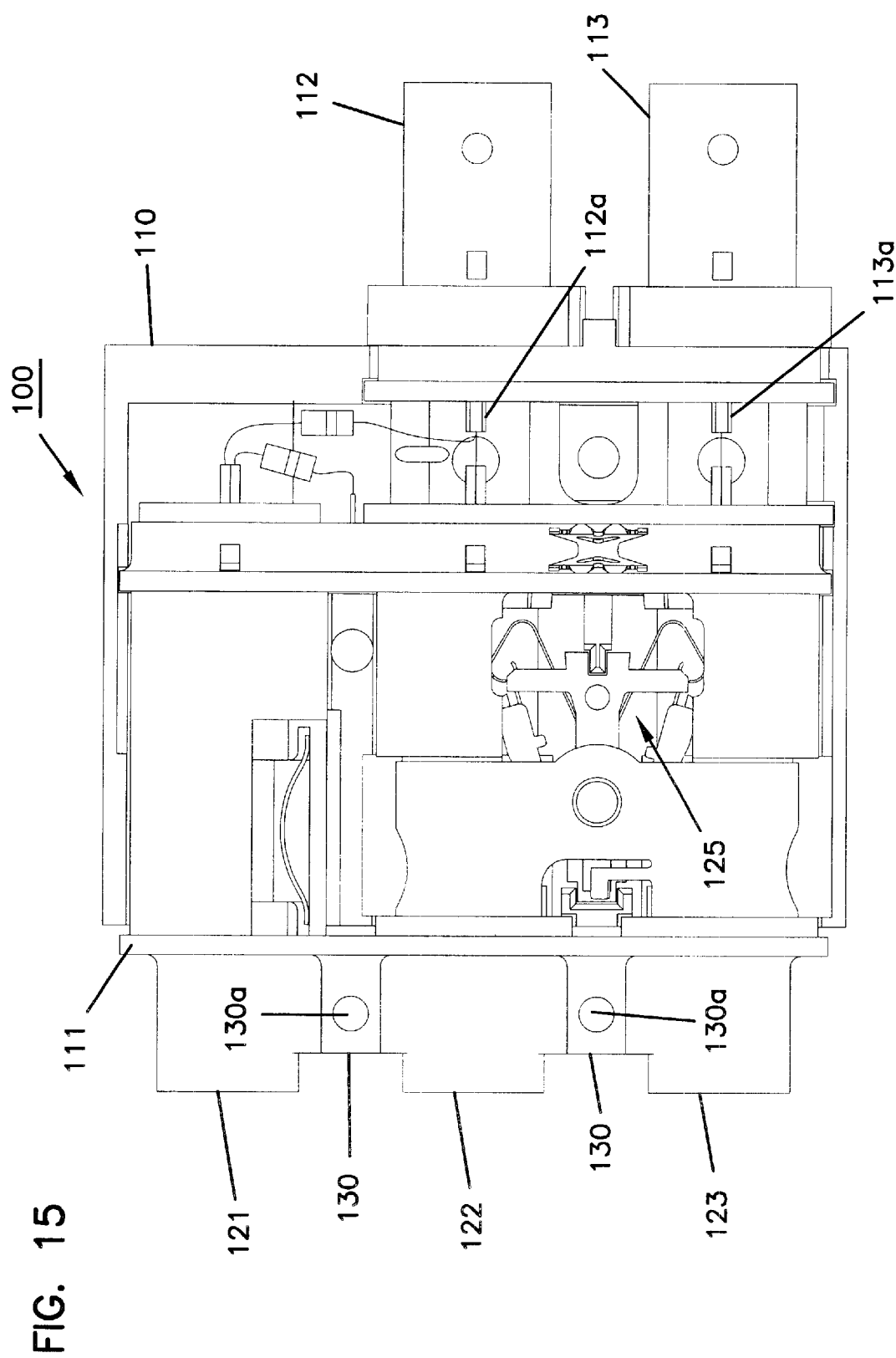

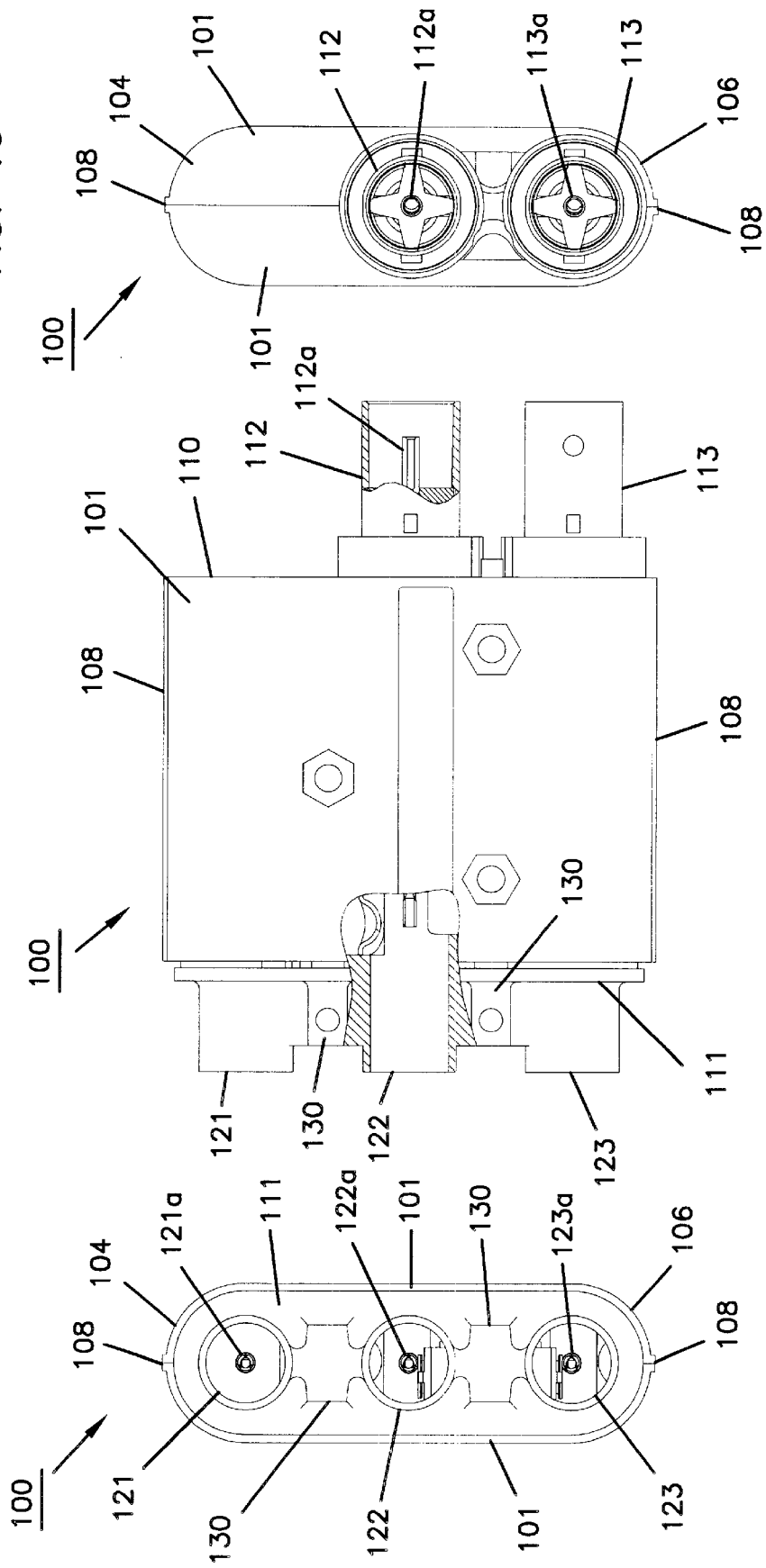

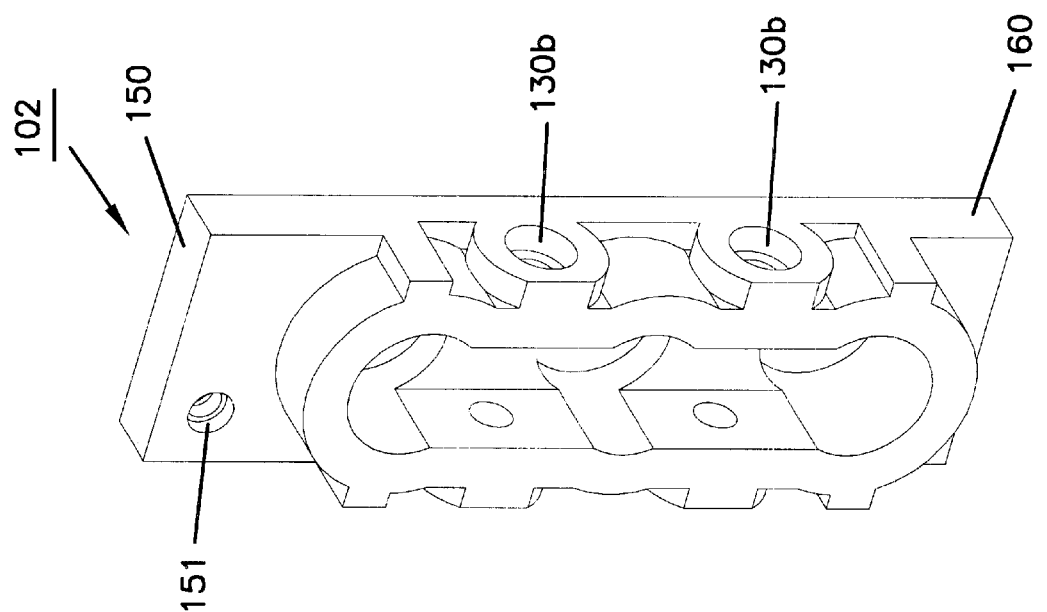
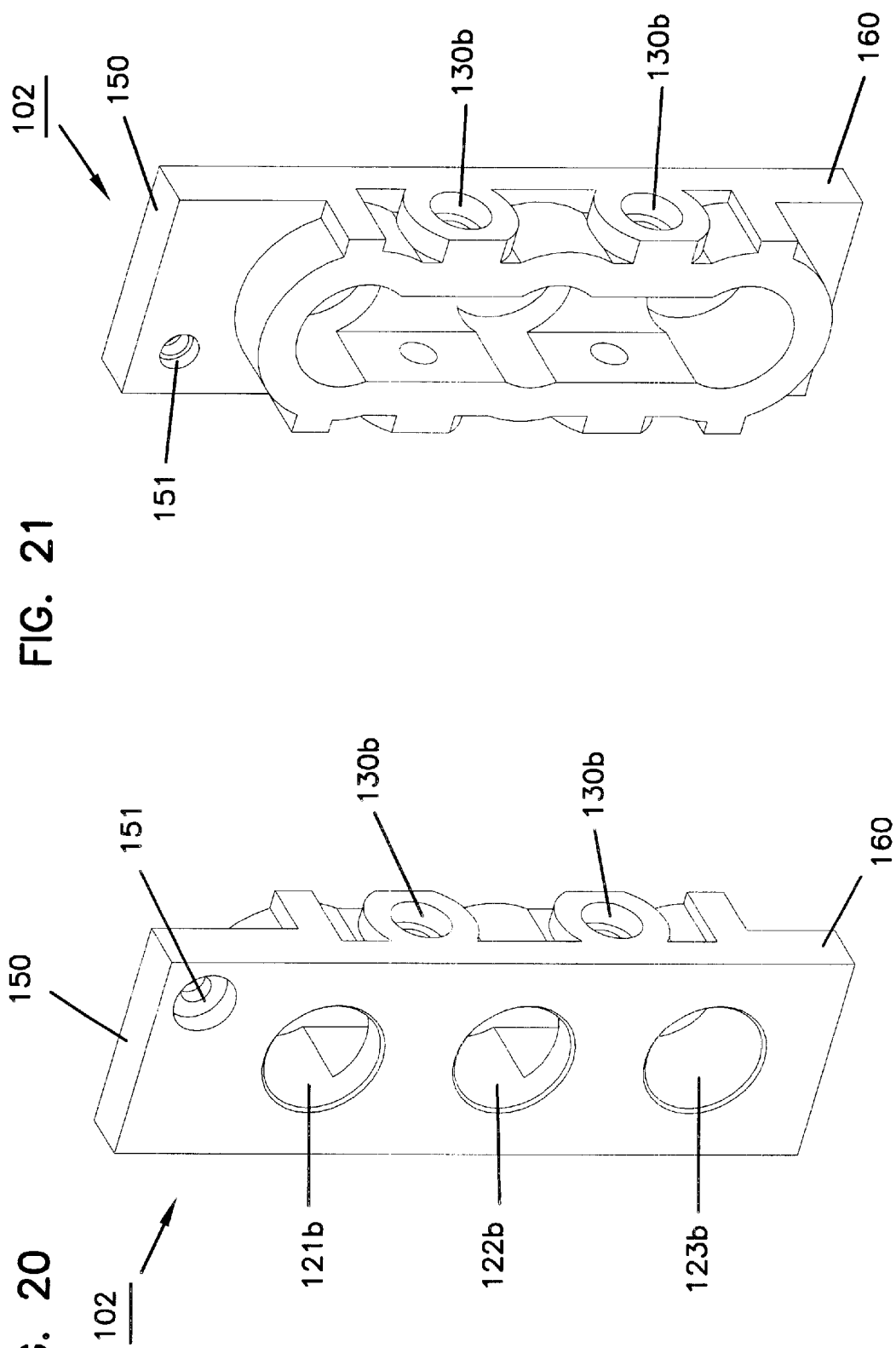

ly, this invention pertains to a module con-
DSX MODULE WITH REMOVABLE JACK

This application is a continuation of application Ser. No. 09/226,761, filed Jan. 6, 1999, now U.S. Pat. No. 6,328,608 B1, and Ser. No. 08/808,086, filed Feb. 28, 1997, now U.S. Pat. No. 5,913,701, which application(s) are incorporated herein by reference.

I. BACKGROUND OF THE INVENTION

1. Field of the Invention

This invention pertains to switching jacks for the telecommunication and data and video transmission industries. More particularly, this invention pertains to a module containing removable switching jacks.

2. Description of the Prior Art

In the telecommunications industry, modules having switching jacks for performing inter-connect and cross-connect functions are well known. An example of such is shown in U.S. Pat. No. 4,815,104 to Willams et al dated Mar. 21, 1989. With reference to FIG. 5 of the '104 Patent, jacks 144 are mounted in the interior of a housing and permanently connected to cables 82,84,86,88 which extend rearwardly from the jacks to connectors 74,76,78 and 80 on a rear panel of the module housing.

The jacks used in inter-connect and cross-connect modules are well known switching jacks. In addition to those shown in U.S. Pat. No. 4,815,104, switching coax jacks are disclosed in U.S. Pat. No. 4,749,968 to Burroughs dated June 1988, U.S. Pat. No. 5,348,491 to Louwagie et al dated Sep. 20, 1994 and U.S. Pat. No. 5,246,378 to the Seiceanu dated Sep. 21, 1993. Both of the '491 and '378 patents teach jack modules which include not only switching components but monitor ports for permitting monitoring functions without signal interruption.

From time to time, switching jacks may fail. While this is a low probability event, it requires replacement of the switching jack. In designs such as that of U.S. Pat. No. 4,815,104, the entire jack module must be replaced in the event of the failure of any one of the two switching jacks.

It is undesirable to have to remove the entire jack module in the event of the failure of one of the two switching jacks within the jack module. Further, as telecommunications facilities are being developed, it is desirable to pre-cable and install modules without the need for having switching jacks present during the cabling. For example, with reference to U.S. Pat. No. 4,815,104, the module is installed in a cabinet and telecommunications equipment is secured to the module by coax cables coupled to the connectors on the rear panel of the module. The forward ports on the module permit access to the circuit as desired. However, normal operation proceeds without any access occurring.

When being developed, telecommunications equipment facilities find economies in the ability to cable-up modules during the development of the facilities prior to the modules actually being needed for use. However, this is a very expensive procedure since the switching jack modules are idle for a substantial period of time. If the jacks were separate from the module, the modules could be pre-installed without jacks during the facilities development phase and jacks could be added to the modules as the circuit requirements of the facility grew.

It is an object of the present invention to provide DSX modules with removable switching jacks.

II. SUMMARY OF THE INVENTION

According to a preferred embodiment of the present invention, a switching coax jack module is disclosed which includes a housing unit having walls defining an interior. Interior walls define first and second recesses disposed along the front end of the module. Coax cable connectors are secured to an end wall of the housing and sliding coax connectors are mounted on the interior walls in communication with the recesses. Coax cables connect the sliding coax connectors with the coax cable connectors on the end walls. Each of the sliding coax connectors is adapted to slidably receive an individual one of a mating connector. Jack devises are provided each having a jack body sized to be received within the recesses. Mating connectors are provided on rear walls of the jack bodies and positioned to slidably mate with the sliding coax connectors as the jack body is inserted into the recess.

III. A BRIEF DESCRIPTION OF THE DRAWINGS

FIG. 1 is a side elevation view of a module according to the present invention for use in an interconnect application;

FIG. 2 is front elevation of the module in FIG. 1;

FIG. 3 is a rear elevation view of the module of FIG. 1;

FIG. 4 is a side elevation view of a housing for use in the module of FIG. 1 and showing a sliding coax connector attached to a coax cable;

FIG. 5 is an exploded view of the sliding coax connector and attached cable of FIG. 4;

FIG. 15 is a side elevation view of the jack device of FIG. 14 with a cover member removed to expose internal components;

FIG. 17 is a front elevation view of the jack device of FIG. 14;

FIG. 18 is a partial sectional side elevation view of the jack device of FIG. 14;

FIG. 19 is rear elevation view of the jack device of FIG. 14;

FIG. 20 is a front perspective view of a front panel for the jack device of FIG. 14; and FIG. 21 is a rear perspective view of the front panel of FIG. 20;

IV. DESCRIPTION OF THE PREFERRED EMBODIMENT

Referring now to the several drawing figures in which identical elements are numbered identically throughout, a description of a preferred embodiment of the present invention will now be provided.

Figure 1A:
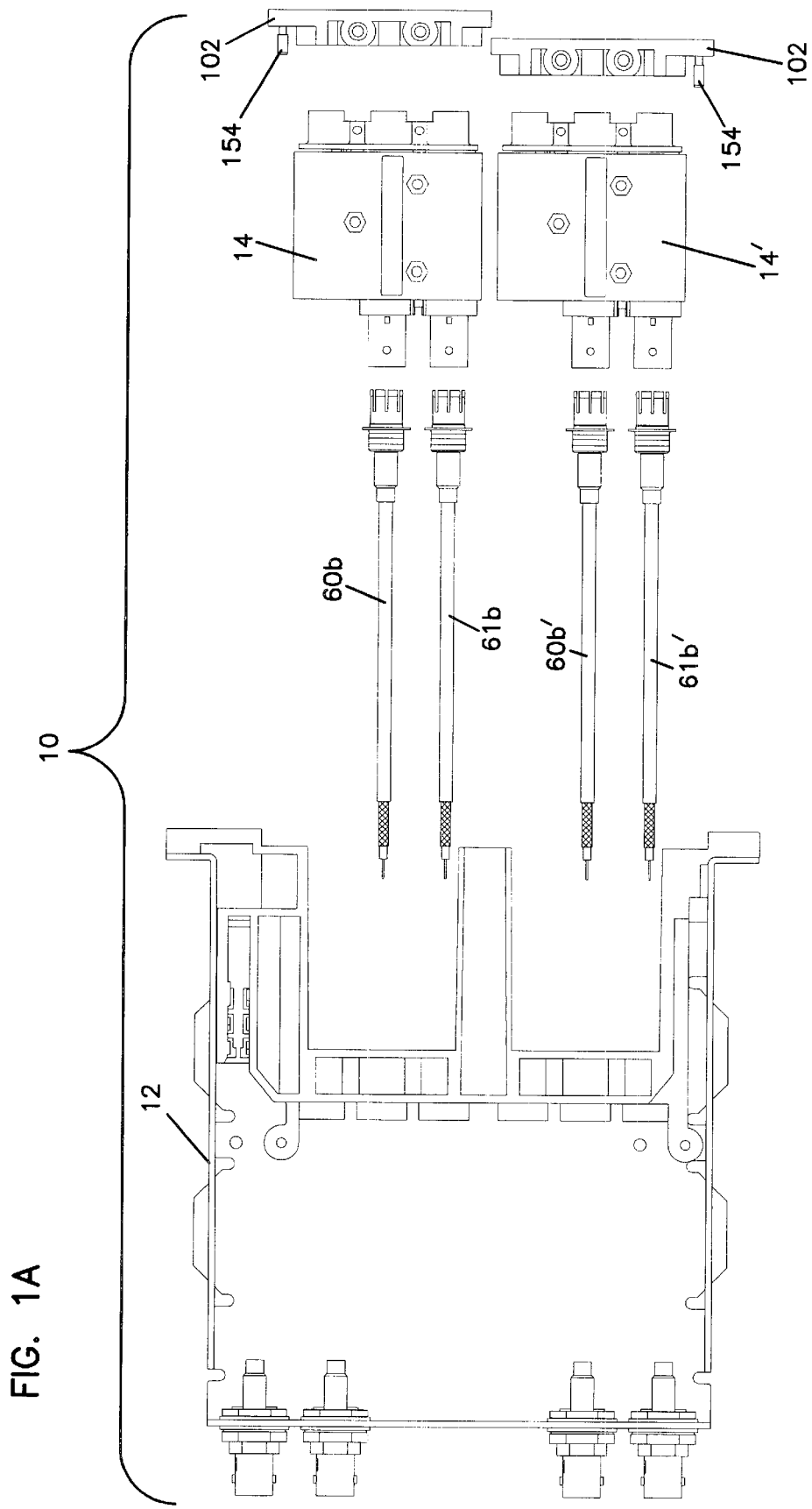
FIG. 1A is a side elevation view of FIG. 1 with the jacks and the internal cables shown in exploded form.
Figure 7:
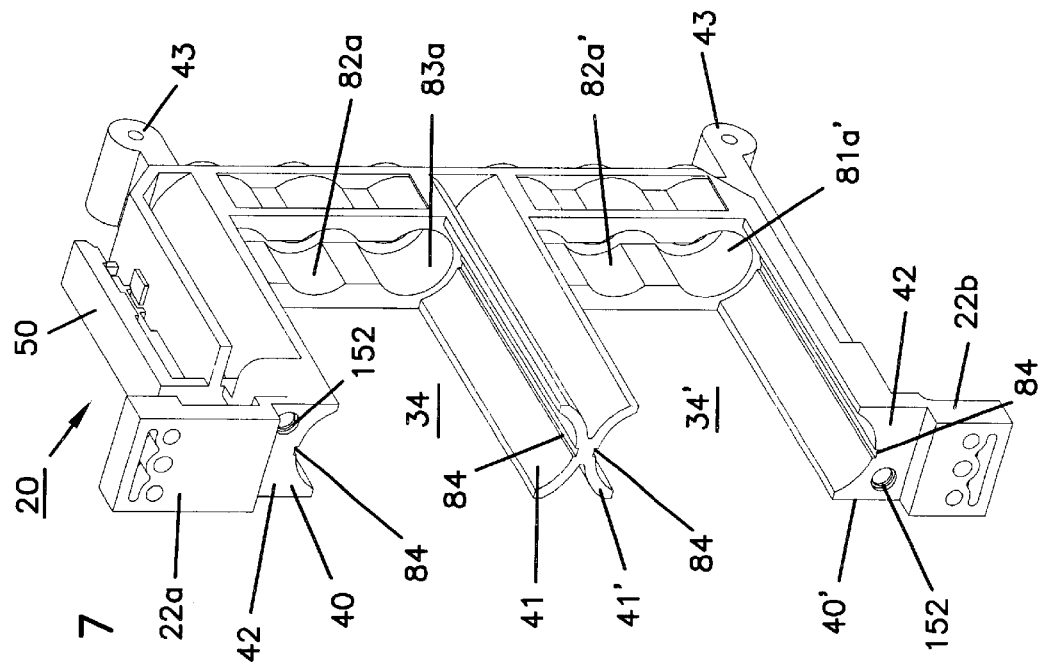
FIG. 7 is a front perspective view of the wall structure of FIG. 6.
Figure 6:
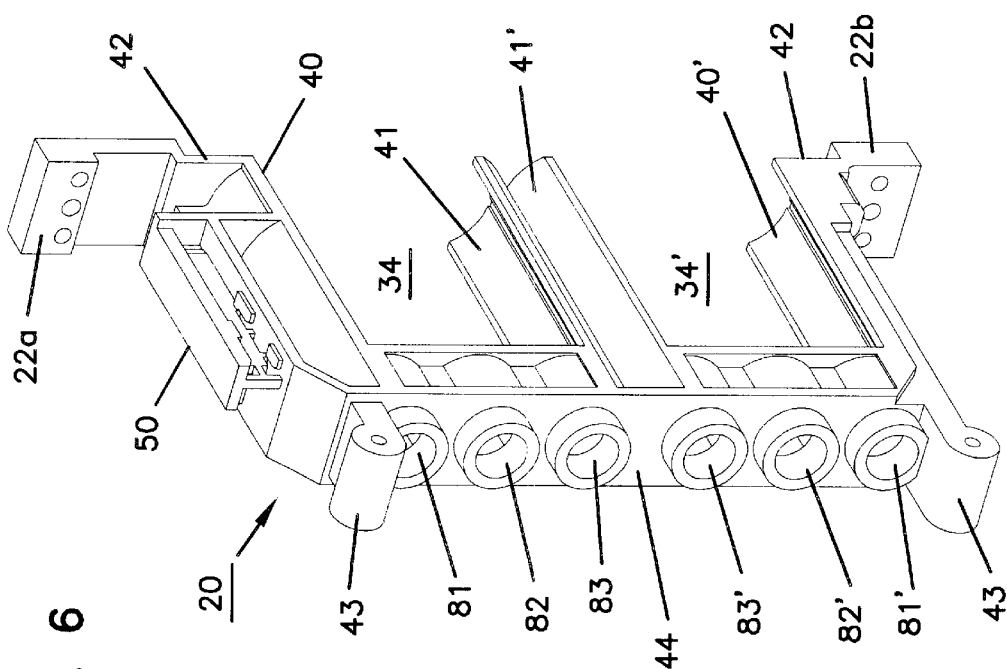
FIG. 6 is a rear perspective view of an internal wall structure of the housing of FIG. 4.

With initial reference to FIGS. 1–3, a jack module 10 is shown including a housing unit 12 and two jack devices (or, more simply, jacks) 14,14'. As will be more fully described, the jacks 14,14', are individually removable from the housing unit 12. The housing has a front end 22, a rear end 24, a side wall 26 and top and bottom walls 28, 30. The walls 28,30,24,22, and side wall 26 define a housing interior 29.

In the embodiment of FIGS. 1–3, the jack module 10 is an interconnect module for interconnect applications. As such it does not include tracer lamps and pin jacks commonly found in modules for cross-connect applications. It will be appreciated that the present invention can be utilized for both inter-connect and cross-connect applications as well as other uses.

The housing unit 12 includes a sheet metal housing 16 (most clearly shown in FIGS. 4 and 11–13), together with an internal wall structure 20 (separately shown in FIGS. 6–10).

A longitudinal axis X—X (FIG. 1 only) extends from the front wall 22 to the rear wall 24 with the top and bottom walls 28,30 being parallel to the longitudinal axis X—X. Best shown in FIG. 2, the front end 22 extends in a first transverse dimension Y—Y perpendicular to axis X—X and has a transverse width Z throughout the length of axis Y—Y. The interior wall structure 20 is positioned within the interior 29 and contained within the width dimension Z.

The top and bottom walls 28,30 include rails 32 to be received within aligned grooves (not shown) of a chassis (not shown) into which the housing 12 may be inserted in side-by-side relation to similarly constructed modules contained within the same chassis. The front wall has mounting tabs 23 for attachment to a chassis. Mounting blocks 25 having mounting screws 27 passing through tabs 23.

The housing contains the interior wall structure 20 which defines two recesses 34,34' (FIG. 4) which are linearly aligned along the axis Y—Y and open to the front end 22.

Figures 8, 9:
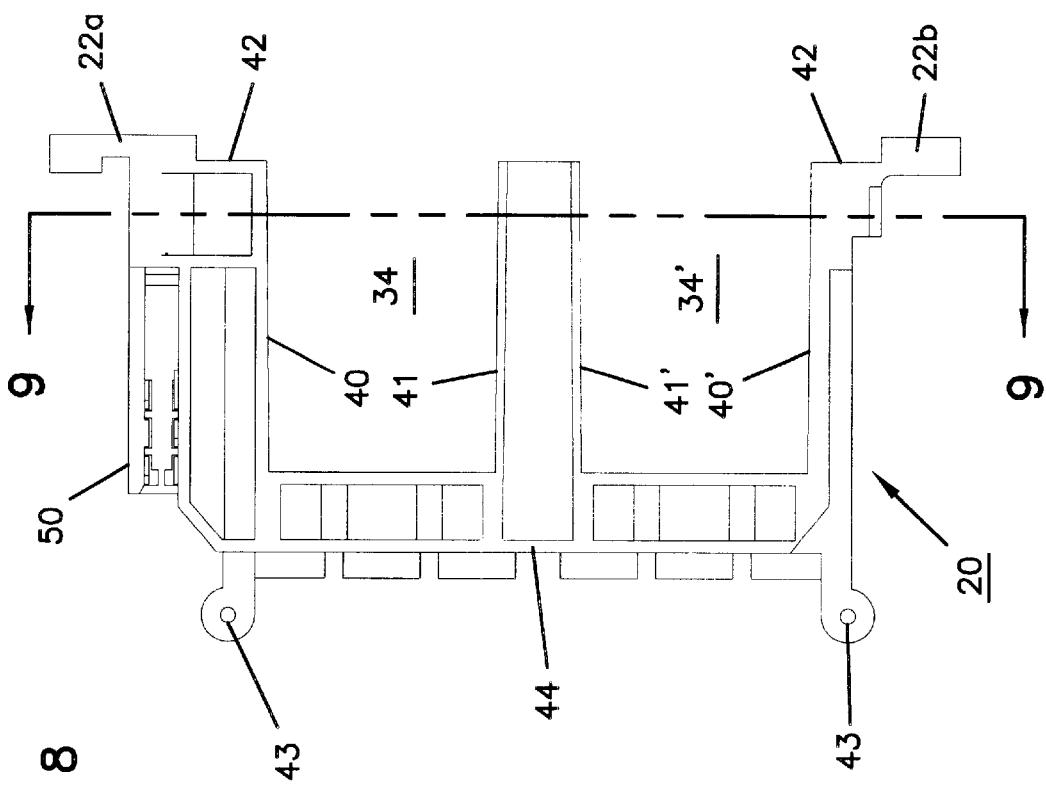
FIG. 8 is a side elevation view of the wall structure of FIG. 6.
FIG. 9 is a view taken along a line 9—9 of FIG. 8.
Figure 11:
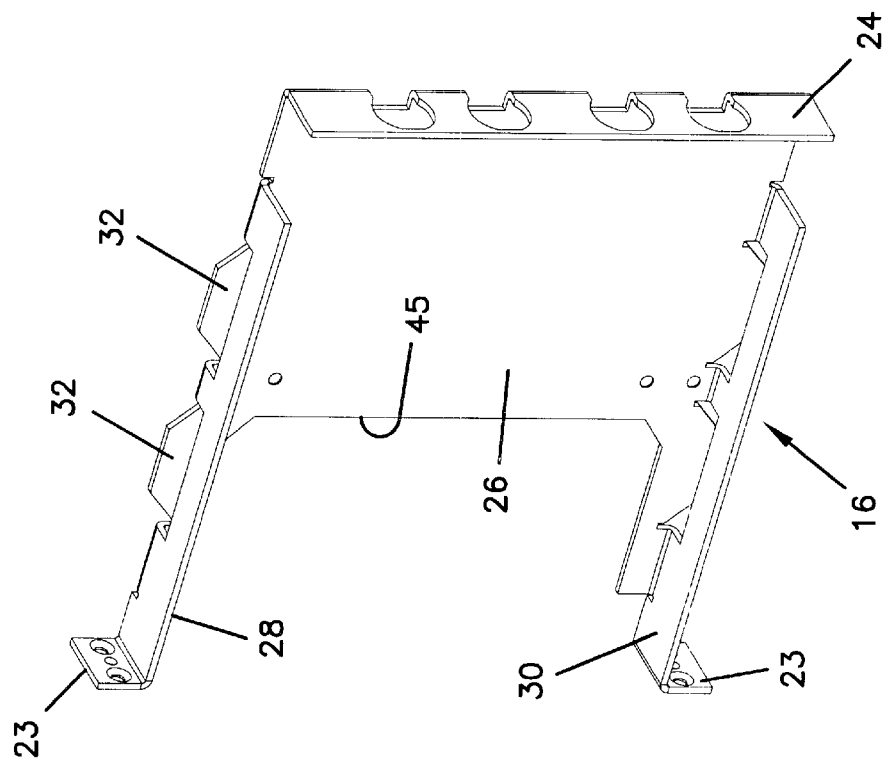
FIG. 11 is a rear perspective view of the housing shown in FIG. 4.

The interior wall structure 20 is best shown in FIGS. 6–10 and includes parallel spaced apart guide rails 40,41,40' and 41' which are parallel to axis X—X and spaced apart to define the recesses 34,34'. The walls 40,40',41, 41' are joined by an end wall 44. Further, extending from walls 40,40' are front wall portions 22a,22b, which define the front wall 22 of the housing 12. Each of the rails 40,40',41,41' is spaced back from the front wall portions 22a,22b to define a recess 42 (FIG. 8).

A support 50 is attached to wall 40 for supporting a tracer lamp and pin jack (not shown) as are customarily used in cross-connect applications to permit tracer lamps and pin jacks to be inserted within the structure 50 and accessed through the wall 22a for cross-connect applications.

The side wall 26 of the housing has a cutout 45 (FIGS. 11 and 12) at the forward end. The wall structure 20 is mounted with screws received within bosses 43 and with the rear wall 44 aligned with the edge of the cutout 45.

Coax connectors 60,61,61',60' are secured to the rear wall 24 for attachment to coaxial cables. The connectors 60,61, 60',61' are well known BNC connectors in a preferred embodiment.

Pairs of identical sliding coax connectors 60a,61a,60a', 61a' are mounted to the rear wall 44. Connectors 60,60a; 61,61a; 60',60a' and 61',61a' are joined by coaxial cables 60b,60b',61b,6b' completely contained within the interior 29 of the housing as best shown in FIG. 1.

Each of the mating sliding coax connectors is identical. For ease of illustration, connector 60a is best shown with reference to FIGS. 4 and 5. The connector 60a includes fingers 62 which are resilient spring contacts disposed in a cylindrical array mounted to a mandrel 64 and a hub 66. The hub 66 can be press fit within holes formed in the rear wall 44. A center pin 68 is contained within a dielectric spacer 70 and disposed within the hub 66 with the center pin 68 centrally positioned surrounded by the fingers 62.

A cable 60b is secured to the sliding connector with a center conductor 72 of cable 60b received within the pin 68 and with the groundshield 74 and jacket 76 of the cable 60b secured to the mandrel 64 by a crimp sleeve 78.

Figure 10:
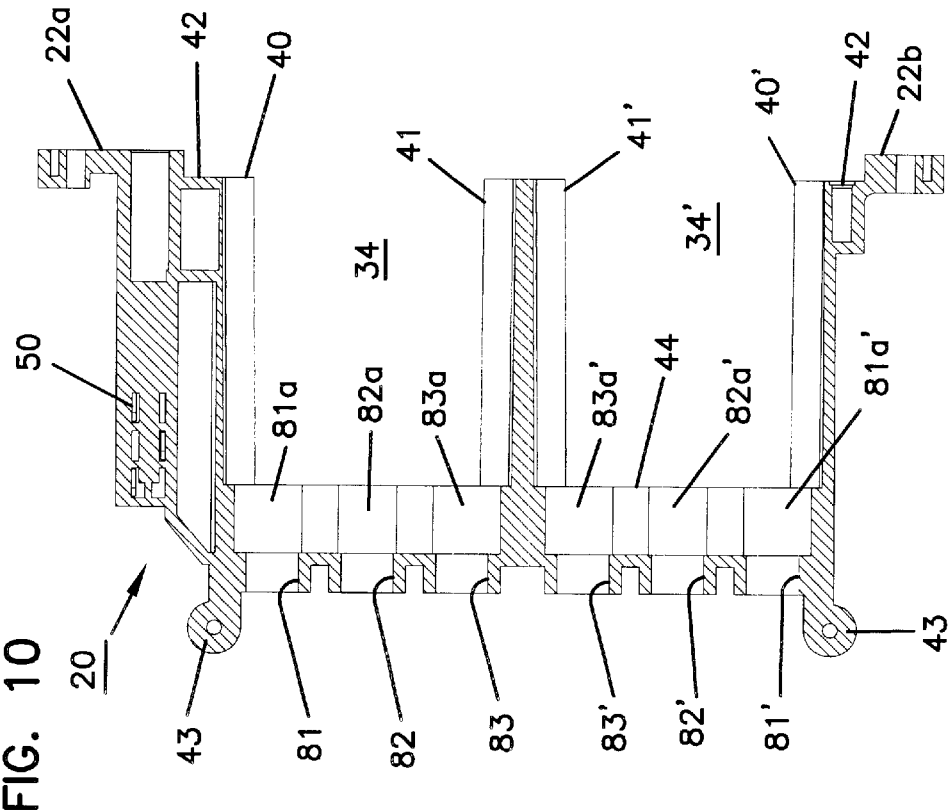
FIG. 10 is a side sectional view of the wall structure of FIG. 6.
Figure 13:
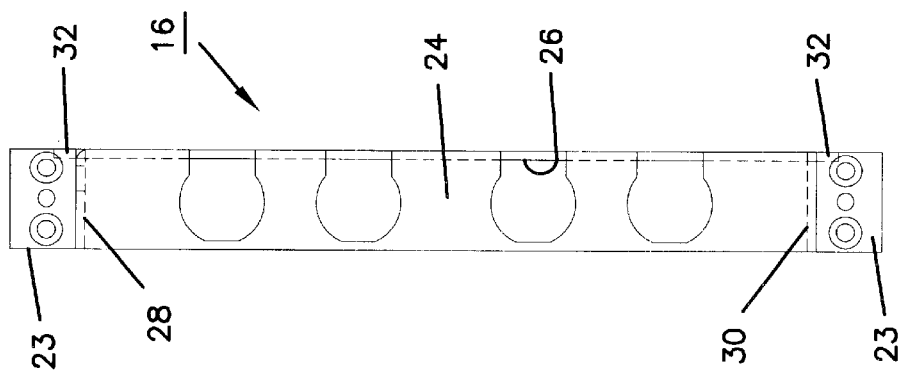
FIG. 13 is a rear elevation view of housing of FIG. 11.
Figure 12:
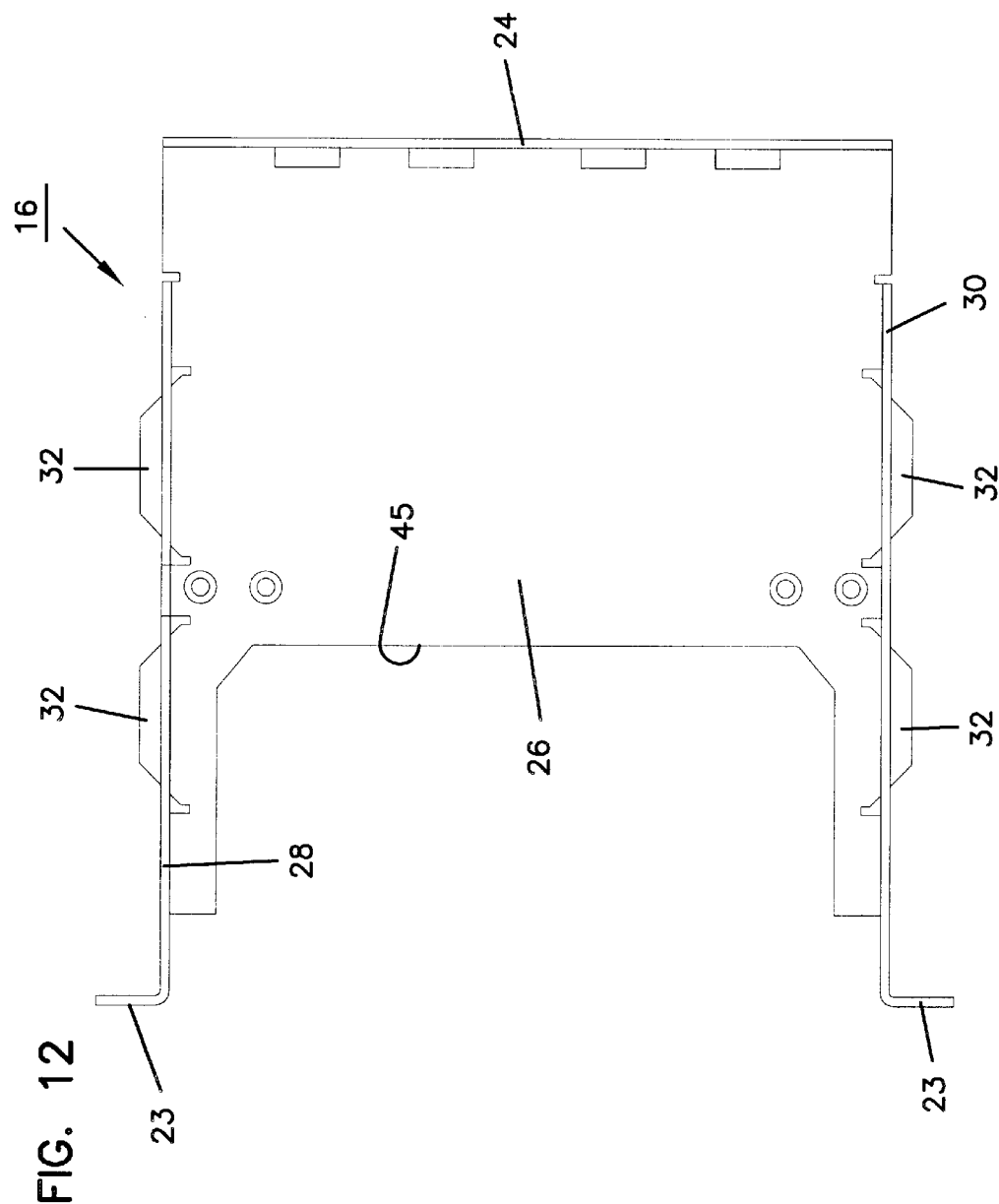
FIG. 12 is a side elevation view of the housing of FIG. 11.
Figure 16:
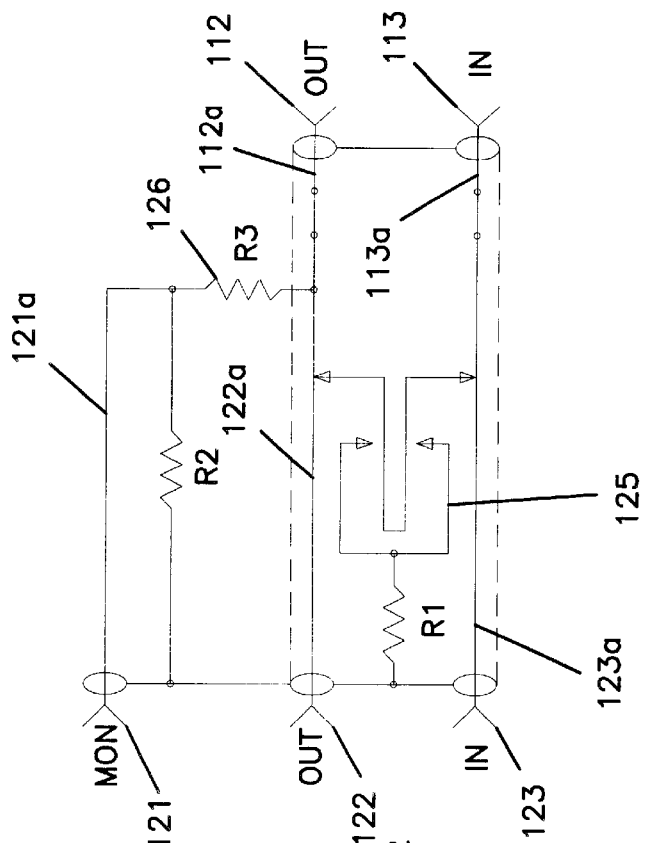
FIG. 16 is an electrical schematic of the jack device of FIG. 14.
Figure 14:
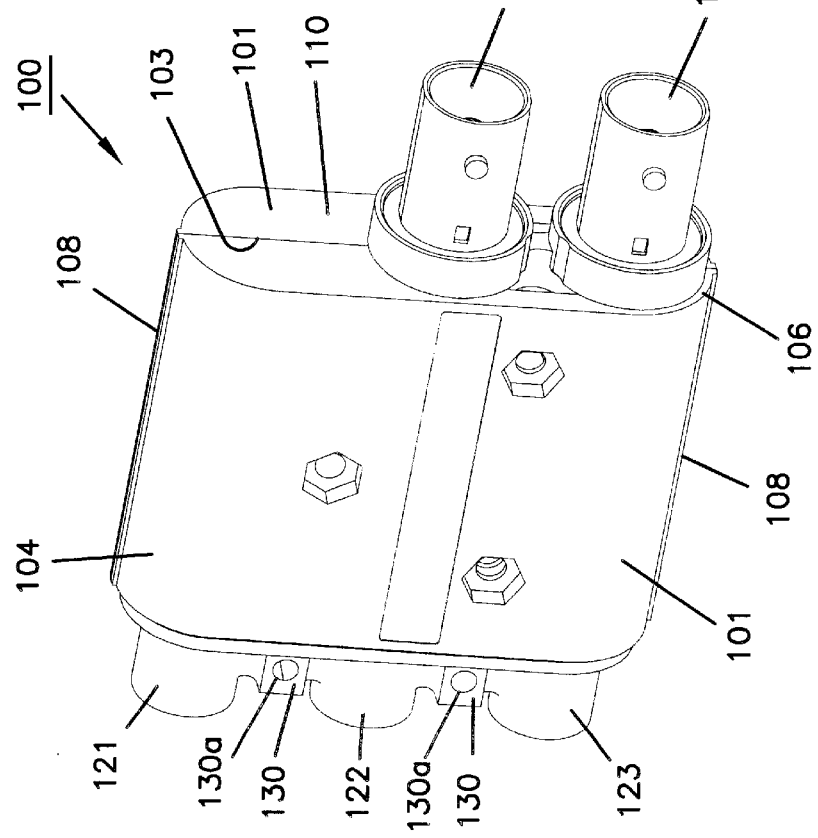
FIG. 14 is a rear perspective view of a jack device (less front panel) for use in the module of FIG. 1.

Best shown in FIG. 10, the rear wall 44 contains three holes 81,82,83,81',82',83' for each of the recesses 34,34'. The holes 81,82,83,81',82',83' include a center hole 82,82' having an axis parallel to and centrally positioned between walls 40,41 and 40',41'. Remaining holes 81,83; 81',83' are parallel to and equally spaced from holes 82,82' on opposite sides thereof. All of the holes in the rear wall 44 are disposed in a linear array along the dimension of the axis Y—Y.

For reasons that will become apparent, each of walls 40,41,40',41' is arcuate in cross-section and includes opposing surfaces such that wall 40 arcs toward and opposes wall 41 and wall 40' opposes and arcs toward wall 41'. The walls have opposing linear grooves 84 (FIG. 9) extending the lengths of the walls.

Concentric with each of holes 81–83 and 81'–83', the wall 44 has bores 81a–83a and 81a'–83a' as shown in FIG. 9. The bores 81a–83a, 81a'–83a' are sized for each to pass a standard BNC connector for purposes that will become apparent.

The fingered contacts 62 of the sliding connector 60a, 61a,60a' and 61a' are sized to be slidably engaged on the interior of a standard BNC connector as the BNC connector is inserted into bores 82a,83a,82a' and 83a', respectively, and urged toward the sliding connector. Sliding connectors and mating connectors are shown in operation in FIGS. 17 and 18 of commonly assigned U.S. Pat. No. 5,214,673 to Morgenstern et al dated May 25, 1993.

The jack 14,14' are identical and include a jack body 100 and a cover plate 102. The jack body 100 is shown separately in FIGS. 14–19. The jack body 100 includes left and right shells 101 which are joined at a part line 103. The jack body has a width approximately equal to the transverse dimension Z (FIG. 2). The height of the body is equal to the spacing between opposing walls 40,41 and 40',41'. The upper and lower edges 104,106 of the body are complimentary shaped to the shaping of the walls 40,41,40',41' and include a flange 108 to be received within the grooves 84 of the walls 40,41,40',41'.

A rear end 110 of the body is provided with BNC connectors 112,113 which are sized to fit within the bores 81a–83a, 81a'–83a'. Accordingly the BNC connectors 112, 113 are mating sliding connectors such that the fingers 62 of the sliding connectors 60a,61a,60a',61a' are received within the interior of the BNC connectors 112,113 and urge against the interior cylindrical wall of the BNC connectors 112,113. Best shown in FIGS. 18 and 19, each of the BNC connectors 112,113 includes an internal center pin 112a,113a which is hollow to receive the solid center pin 68 of the sliding connectors 60a,61a,60a',61a' when the BNC connector is slidably coupled with the sliding connector.

The forward wall 111 of the jack body 100 includes three ports 121,122,123 including two ports 122,123 aligned with each of the BNC connectors 112,113. Each of the ports 121–123 expose an interior center conductor 121a–123. An OUT center conductor 122a extends through the center port 122 and is electrically connected to the center pin 112a the rear BNC connector 112. An IN center conductor 123a extends from the lower port 123 and the center conductor 113a of the lower BNC connector 113. A switching circuit 125 is provided between the two center conductors 122a, 123a such that insertion of a plug into either of the ports 122,123 terminates a normal electrical connection between the BNC connector locations 112,113 and isolates the opposite center conductor to ground.

The third port 121 includes a center conductor 121a connected across to resistance 126 to the OUT conductor 122a. Insertion of a plug into the third port 121 permits monitoring of a signal on the OUT center conductor 122a without interrupting flow of a signal from the middle BNC connector 112 to the lower BNC connector 113.

The jack 100 is electrically conductive to provide a groundshield for internal circuit components. It will be appreciated that jacks with such internal circuitry are well known in the art and examples of such are shown in U.S. Pat. No. 5,348,491.

The forward end 111 of the jack includes flats 130 disposed on both sides of the jack 100 between the ports 121–123. The flats 130 have threaded bores 130a for receiving screws 132 (FIG. 1).

The dielectric cover 102 is shown in FIGS. 20 and 21 and includes three holes 121b,122b,123b to be aligned with the ports 121–123 such that the cover 102 can be slid over the ports 121–123 onto the front end 111 of the jack 100. Holes 130b on the sides of the covers 102 permit the passage of the threaded screw 132 through the front plate 102 and into the holes 130a on the sides of the jack 100 to securely fasten the front cover 102 to the front 111 of the jack 100.

The front cover 102 is provided with flanges including and upper flange 150 sized to be received within the recess 42. A hole 151 is passed through the flange 150 and aligned with a threaded insert 152,152' (FIG. 4) in the recess 42. As a result, a screw 154 (FIG. 2) can be removably replaced into the holes 151,152 to removably secure the jack 14 to the module 10.

A second flange 160 protrudes along an opposite side of the front plate 102. The flanges 150,160 are sized such that when two jacks 14,14' are placed within the recesses as illustrated in FIG. 1, the front plates 102 are received within the recesses 42 and form a continuous plastic plate along the front edge 22.

It will be noted that the rear wall 44 of the interior wall structure 20 includes three holes per recess including a centrally positioned hole 82,82' and the remaining holes 81,81',83,83' being symmetrical about the centrally positioned hole 82,82'. Three holes are utilized to permit modification of the design to include a monitor BNC mating connector off of the rear end 110 of the jack 100 to couple with a monitor sliding connector which could be added into the third hole to permit monitoring capabilities off of the rear end 24 of the module 10. Also, three holes are provided to permit the manufacturer of an end wall symmetrical about axis X—X.

The positioning of the holes on the rear wall 44 and their relative spacing is selected to be symmetrical about the axis of the center hole 82,82'. Further, the rear BNC 112 is selected to be positioned along the center line between the top and bottom edges 104,106 of the jack. As a result, the center BNC 112 connects with the center hole 82,82' sliding connector whenever the jack is rotated 180 degrees about it's longitudinal axis. Accordingly, the jack can be fitted into either of the upper or lower recesses 34,34' without the need for a separate inventory of different jacks for the upper and lower recesses. The front plates may be provided with silk screening or other indicators which may be rotated as desired to provide an indication to an operator of the various functions of the ports.

With the devise thus described, an individual jack may be removed and replaced without the need for removal of the other jack within the module or without need for removal of the entire module from an installation. Furthermore, a module (without jack), may be pre-cabled in an installation and jacks may be added to modules when desired to bring a circuit on-line. Also, the design permits a single inventory of jacks which may be symmetrically positioned. Further, the mating geometry of the guide walls and edges of the jacks insure accurate alignment of the jacks when they are slid into position to be immediately coupled with the sliding connectors. The passage of a screw through the upper flange of each of the front plates permits a jack to be secured to the module and prevents undesired disruption of the jack when a plug is inserted or removed from a jack port.

When the foregoing detailed description of the present invention it has been shown how the objects of the invention have been obtained in a preferred manner. Modifications and equivalents of the disclosed concepts such as those which readily occur to one skilled in the art are intended to be included within the scope of the claims which are appended hereto.

What is claimed is:

1. A jack module system comprising:

a housing defining an interior, the interior having access through an opening;

first and second jacks, each jack having a jack body having a front and a rear and a width having a first transverse dimension,
    said jack body further having upper and lower edges;
    first and second mating connectors disposed on said rear of said jack body with an axis between said upper and lower edges parallel with a second transverse dimension;
    said jack body including first and second forward ports on said front wall for receiving a jack plug;
    a switching circuit within said body for normally electrically connecting said mating connectors in the absence of a jack plug in either of said ports and for opening said connection upon insertion of a jack plug into either of said ports;

receiving means disposed within the interior of the housing for slidably receiving the jack bodies in a first direction, wherein the jacks are stacked along an axis perpendicular to the first transverse dimension when received into the receiving means and wherein the jacks are slidably removable in a direction opposite the first direction;

a cover removably securing the jack bodies in the receiving means, the cover defining at least one opening aligned with one of the forward ports;

rear electrical access locations on the housing; and an electrical link between the first and second mating connectors of the jack bodies and the rear electrical access locations on the housing.

2. The system of claim 1, wherein the cover includes two sections, wherein each section is capable of independently securing a single jack body into the receiving means.

3. The system of claim 1, wherein each of the upper and lower edges of each of the jack bodies include a pair of opposed arcuately shaped walls and the receiving means includes a complementary structure for slidably receiving the arcuately shaped walls.

4. The system of claim 1, wherein each jack body is capable of being slidably received into the receiving means in a first position and also capable of being inserted into the receiving means after being rotated 180 degrees from the first position along an axis defined by a centerline of the jack body.

5. The system of claim 1, wherein the cover includes first and second sections, and further wherein the first section removably secures the first jack body into the receiving means and the second section removably secures the second jack body into the receiving means.

6. The system of claim 1, wherein the cover is received into a recess in the opening of the housing to form a planar face over the opening.

* * * * *